(12) United States Patent
Lin et al.

(10) Patent No.: US 10,735,578 B2
(45) Date of Patent: Aug. 4, 2020

(54) METHOD FOR UNLOCKING A MOBILE TERMINAL, DEVICES USING THE SAME, AND COMPUTER-READABLE STORAGE MEDIA ENCODING THE SAME

(71) Applicant: BEIJING XIAOMI MOBILE SOFTWARE CO., LTD., Beijing (CN)

(72) Inventors: Zhaoqin Lin, Beijing (CN); Zheng Yan, Beijing (CN); Yudong Chang, Beijing (CN); Yuning Li, Beijing (CN); Chengxing Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/518,681

(22) Filed: Jul. 22, 2019

(65) Prior Publication Data

US 2020/0128124 A1    Apr. 23, 2020

(30) Foreign Application Priority Data

Oct. 19, 2018   (CN) .......................... 2018 1 1224777

(51) Int. Cl.
*H04W 4/00*     (2018.01)
*H04M 1/725*    (2006.01)
*H04M 1/02*     (2006.01)
*G06K 9/00*     (2006.01)

(52) U.S. Cl.
CPC .... *H04M 1/72577* (2013.01); *G06K 9/00255* (2013.01); *G06K 9/00288* (2013.01); *H04M 1/0237* (2013.01); *H04M 1/0264* (2013.01); *H04M 1/7258* (2013.01)

(58) Field of Classification Search
CPC .. H04W 12/06; H04W 12/08; H04M 1/72577
See application file for complete search history.

(56) References Cited

U.S. PATENT DOCUMENTS

| 2010/0216447 | A1* | 8/2010 | Park | H04M 1/0235 455/418 |
| 2011/0151934 | A1 | 6/2011 | Geng | |
| 2017/0126979 | A1* | 5/2017 | Evans, V | H04N 5/2254 |
| 2019/0080189 | A1* | 3/2019 | Van Os | G06K 9/00912 |
| 2019/0304405 | A1* | 10/2019 | Shi | G06F 21/32 |

FOREIGN PATENT DOCUMENTS

| CN | 107563168 A | 1/2018 |
| CN | 107590375 A | 1/2018 |
| CN | 108549802 A | 9/2018 |
| CN | 108600523 A | 9/2018 |
| EP | 1860613 A1 | 11/2007 |

OTHER PUBLICATIONS

Extended European search report of counterpart EP application No. 19194704.3 dated Oct. 11, 2019.
First office action of Chinese application No. 201811224777.0 dated Mar. 16, 2020.

* cited by examiner

*Primary Examiner* — Omoniyi Obayanju
(74) *Attorney, Agent, or Firm* — Syncoda LLC; Feng Ma

(57) ABSTRACT

Methods for unlocking a mobile terminal can include capturing a face image of a user through a front-facing camera of the mobile terminal in response to a sliding action applied to a sliding module on the mobile terminal; and unlocking the mobile terminal by using the captured face image as a key.

16 Claims, 7 Drawing Sheets

METHOD FOR UNLOCKING A MOBILE TERMINAL, DEVICES USING THE SAME, AND COMPUTER-READABLE STORAGE MEDIA ENCODING THE SAME

CROSS-REFERENCE TO RELATED APPLICATION

The present application claims priority to Chinese Patent Application No. 201811224777.0 filed on Oct. 19, 2018, the content of which is hereby incorporated by reference in its entirety.

BACKGROUND

As people's living standards improve, mobile terminals have become indispensable in users' daily lives.

To protect users' privacies and secure user account information, mobile terminals typically require a user to unlock the device before normal use. For example, a user may turn on a mobile terminal's screen through a power button, bring up an unlocking interface, and then input an unlocking password or gesture through the unlocking interface to unlock the mobile terminal.

SUMMARY

The present disclosure relates generally to the field of mobile terminal technologies, and in particular, to methods for unlocking a mobile terminal, as well as devices implementing the same, and computer-readable storage media encoding the same.

The present disclosure provides methods for unlocking a mobile terminal, as well as control mechanisms and devices implementing the same, and computer-readable storage media encoding the same.

According to a first aspect of the present disclosure, there is provided a method for a user to unlock a mobile terminal, including: capturing a face image of the user through a camera of the mobile terminal in response to a sliding action applied to a sliding module of the mobile terminal; and unlocking the mobile terminal by using the captured face image of the user as a key.

In some embodiments of the present disclosure, when the user slides the cover, the front camera of the mobile terminal is exposed. At this time, the front camera acquires the face image and unlocks the mobile terminal by using the face image. In the entire unlocking process, the user does not need to perform operation steps such as clicking a power button to light a screen, and inputting an unlocking password or gesture on an unlocking interface, but only needs to slide the cover. Therefore, such operation is simple and convenient, and requires less time and labor.

In an implementation of the present disclosure, unlocking the mobile terminal by using the face image includes: comparing features between the face image and a preset face image to obtain a comparison result; and unlocking the mobile terminal when the comparison result indicates that the face image and the preset face image are from the same person.

In this implementation, the feature of the face image shot by the front camera is compared with that of the preset face image in the mobile terminal to perform unlocking. The mobile terminal can be unlocked successfully only when the face image as captured and the preset face are from the same person, thereby ensuring the security.

In an implementation of the present disclosure, the method further includes: lighting or turning on a screen and outputting a touch unlocking interface when the comparison result indicates that the face image and the preset face image are from different persons.

In this implementation, when the face image unlocking fails, an unlocking interface may be output to allow the user to input a password or gesture for unlocking, so that the diversity of the unlocking manners is increased.

In an implementation of the present disclosure, the method further includes: lighting a screen and outputting a main menu interface after the mobile terminal is unlocked.

In this implementation, the screen is not lighted or turned on when the front camera is exposed, but is lighted after the unlocking is successful, so that the user does not need to wait for the unlocking when the screen is lighted. Thus, not only is power saved, but also the user feels that the unlocking speed is higher, improving the user unlocking experience.

In an implementation of the present disclosure, the method further includes: acquiring a sliding event parameter generated by a Hall sensor in the mobile terminal; and determining whether a cover sliding action occurs on the mobile terminal according to the sliding event parameter.

In this implementation, when the user slides the cover, the Hall sensor in the mobile terminal detects the cover sliding action, so that the mobile terminal can perform subsequent operations.

According to a second aspect of the present disclosure, an unlocking device is provided, wherein the unlocking device includes: an acquiring unit, configured to acquire a face image through a camera of a mobile terminal in response to a cover sliding action on the mobile terminal; and an unlocking unit, configured to unlock the mobile terminal by using the face image.

In an implementation of the present disclosure, the unlocking unit is configured to: compare features between the face image and a preset face image to obtain a comparison result, and unlock the mobile terminal when the comparison result indicates that the face image and the preset face image are from the same person.

In an implementation of the present disclosure, the unlocking unit is further configured to light a screen and output a touch unlocking interface when the comparison result indicates that the face image and the preset face image are from different persons.

In an implementation of the present disclosure, the unlocking unit is further configured to light the screen and output a main menu interface after the mobile terminal is unlocked.

In an implementation of the present disclosure, the device further includes a detecting unit configured to: acquire a sliding event parameter generated by a Hall sensor in the mobile terminal, and determine whether a cover sliding action occurs on the mobile terminal according to the sliding event parameter.

According to a third aspect of the present disclosure, there is provided an unlocking control mechanism for a mobile terminal, comprising a processor; and a memory configured to store an instruction executable by the processor, wherein the processor is configured to: capture a face image through a camera of the mobile terminal in response to a sliding action applied to a sliding module of the mobile terminal; and unlock the mobile terminal by using the captured face image as a key.

According to a fourth aspect of the present disclosure, there is provided a computer-readable storage medium having encoded thereon instructions which, when executed by a processor of an unlocking mechanism of the first aspect above, would cause the unlocking mechanism to execute an unlocking method including: capturing a face image through a camera of the mobile terminal in response to a sliding action applied to a sliding module of the mobile terminal; and unlocking the mobile terminal by using the captured face image as a key.

It is to be understood that, both the foregoing general description and the following detailed description are exemplary and explanatory only and are not restrictive of the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

The inventors of the present disclosure have recognized that, the conventional process for unlocking a mobile terminal is very tedious and requires all the steps of turning on the screen by clicking the power button, inputting the unlocking password or gesture into the unlocking interface, and the like, which lead to a time-consuming and laborious unlocking process.

Methods for a user to unlock mobile terminals as described herein are particularly suited for sliding-cover style mobile terminals, which generally are configured to have an all-screen mobile terminal preferably having 100% screen-to-body ratio. In all-screen mobile terminals, because the screen takes up 100% of the terminal's front surface, the placement of a front-facing camera on the mobile terminal becomes a real challenge. Accordingly, sliding-cover designs which provide a cover or panel that can be slid open with a sliding action offers a viable solution for the placement of the front camera. This sliding-cover style mobile terminal will be briefly introduced below with reference to the accompanying drawings.

Figure 1:
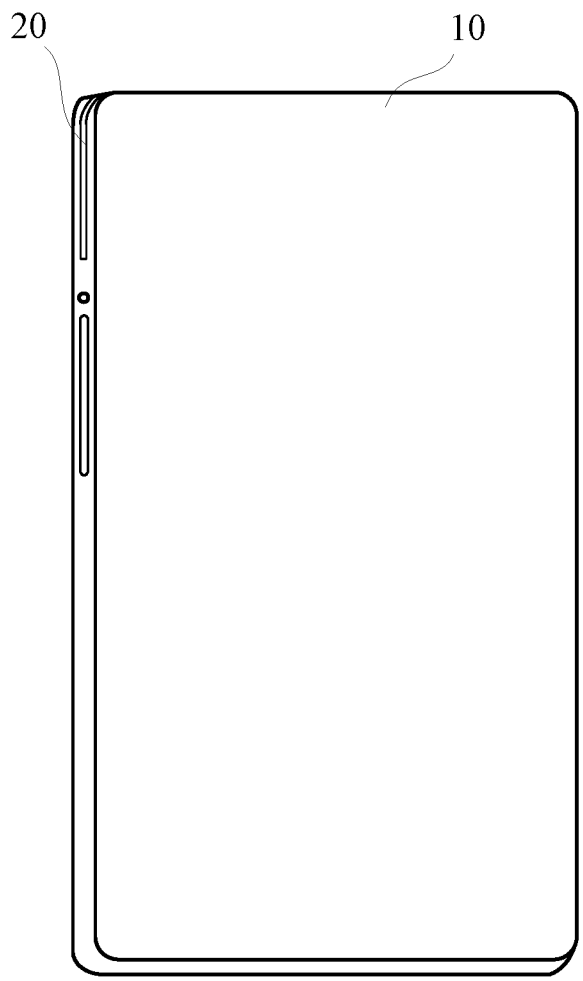
FIG. 1 shows a schematics drawing of a mobile terminal according to some embodiments of the present disclosure.

FIG. 1 is a schematic view showing an exemplary mobile terminal in accordance with one embodiment of the present disclosure. Referring to FIG. 1, mobile terminal 10 has a front surface and a rear surface, wherein the front surface is the screen of the mobile terminal. A sliding module 20 that can slide vertically relative to the screen is provided in the mobile terminal 10.

The various device components, blocks, or portions may have modular configurations, or are composed of discrete components, but nonetheless may be referred to as "modules" in general. In other words, the "modules" referred to herein may or may not be in modular forms.

In some embodiments, such as those illustrated in FIG. 1, the sliding module 20 can be an insert or a block slidably coupled to a frame of the mobile terminal 10. The sliding module 20 can be made of a material similar or the same as that of the frame, such as plastic, metal, composite, etc.

In some other embodiments, the sliding module 20 can be implemented with part of a touch screen of the mobile terminal 10. For example, by sliding the sliding module on the touch screen, a cover portion of the front-facing camera 30 can become transparent, thereby "exposing" the front-facing camera 30. On the other hand, an opposite sliding motion or a command input to the mobile terminal 10 can cause the cover portion to become opaque, thereby "hiding" or turning off the front-facing camera 30.

Therefore, the sliding module 20 can be implemented with mechanical moving parts, or electronically with the screen of the mobile terminal 10 to realize similar functions of hiding and exposing the front-facing camera 30.

Figure 2:
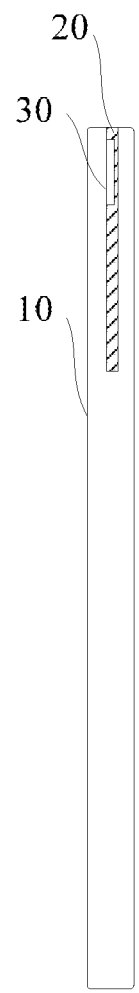
FIG. 2 shows a side view of the mobile terminal where the sliding module is in a retracted position.
Figure 3:
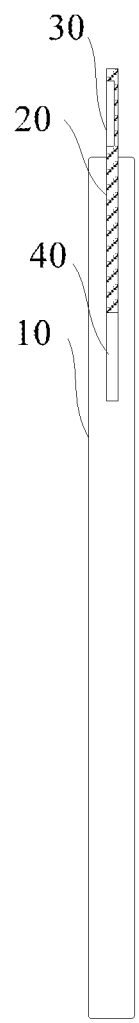
FIG. 3 shows another side view of the mobile terminal where the sliding module is in an extended and exposed position.

FIGS. 2 and 3 are side views of the same mobile terminal 10 shown in FIG. 1. Referring to FIGS. 2 and 3, a front-facing camera 30 is disposed on the sliding module 20. When the front-facing camera 30 is not in use and is hidden from view inside the mobile terminal 10, the sliding module 20 is in a retracted state, namely, inside the mobile terminal. At this time, the state of the entire mobile terminal 10 is as shown in FIGS. 1 and 2. When the front-facing camera 30 is required to be used, the sliding module 20 slides upward to be in a protruding state. At this time, the front-facing camera 30 becomes exposed from the mobile terminal, as shown in FIG. 3, so that the front-facing camera 30 can be used for taking pictures.

In the mobile terminal 10 shown in FIG. 1, the sliding module 20 is shown as being sandwiched between the front surface and rear surface of the mobile terminal 10. That is, a sliding groove 40 is formed between the front-facing screen and the rear body of the mobile terminal 10 such that the sliding module 20 moves vertically along the sliding groove 40.

In other embodiments, the sliding groove 40 may also be located at other positions of the mobile terminal 10, for example, on the rear cover of the mobile terminal 10. The sliding-cover style mobile terminal described in the present disclosure does not put a limitation on the specific structure and position of the sliding module, so long as the front-facing camera can be exposed and hidden from view through a sliding action that extends and retracts the sliding module relative to the main body of the mobile terminal.

Mobile terminals in accordance with embodiments of this disclosure may include, but are not limited to, cell phones, a tablet PCs, and the like.

Figure 4:
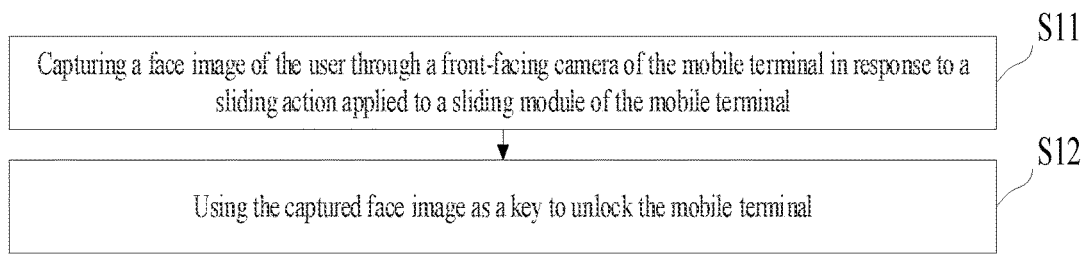
FIG. 4 shows a flowchart of an unlocking method according to some embodiments.

FIG. 4 shows a flowchart of a method for a user to unlock a mobile terminal according to one exemplary embodiment of this disclosure. The method may advantageously be executed by a mobile terminal described herein. Referring to FIG. 4, unlocking methods in accordance with this embodiment will generally include the following steps.

In step S11, a face image of the user is captured through a front-facing camera of the mobile terminal in response to a sliding action applied to the sliding module of the mobile terminal.

In this step, the sliding action refers to an action on or by the sliding module that exposes the front-facing camera. This action can be detected by detecting the position of the sliding module through a position sensor such as a Hall sensor in the mobile terminal.

In this step, the front-facing camera becomes exposed. At the same time, the front-facing camera is activated to capture a face image of the user.

In step S12, the captured face image is used as a key to unlock the mobile terminal.

In some preferred embodiments, the manner of unlocking the mobile terminal is by automatically recognizing the captured face image, rather than conventional means of using password, gesture or fingerprint, so that a user needs not perform additional steps to effectuate unlocking of the terminal.

In some preferred embodiments, the front-facing camera of the mobile terminal is exposed by a user applying a sliding action to the sliding module. At the same time when the front-facing camera is exposed, the camera is activated to capture a face image of the user and unlocks the mobile terminal by automatically recognizing the face image captured. In the entire unlocking process, the user does not need to perform additional operational steps such as clicking a power button to turn on the screen, and inputting an unlocking password or gesture on an unlocking interface, but only needs to expose the front-facing, camera by moving the sliding module. It will be immediately appreciated by those skilled in the art that such operation is simple and convenient, and requires less time and labor.

In addition, this solution avoids accidentally unlocking the terminal when the user merely desires to light up the screen to see the time, thereby saving the processing resources of the system.

In some alternate preferred embodiments, the step of unlocking the mobile terminal by automatically recognizing the captured face image may include: comparing features between the captured face image and a preset face image to obtain a comparison result; and unlocking the mobile terminal when the comparison result indicates that the captured face image and the preset face image are of the same person. If the comparison result indicates that the captured face image and the preset face image are of different people, the terminal is not unlocked.

In these alternative embodiments, the features of the captured face image is compared with that of the preset face image in the mobile terminal to perform unlocking. That is, the mobile terminal can be unlocked successfully only when the captured face image and the preset face image are of the same person, thereby ensuring security of the mobile terminal.

In some further alternative embodiments, the method further includes: lighting up a screen and presenting a touch unlocking interface when the comparison result indicates that the captured face image and the preset face image are from different persons and the unlocking of the mobile terminal fails.

In these further embodiments, when unlocking by face image recognition fails, the touch-based unlocking interface is presented to allow the user to input a password or gesture for unlocking, so as to increase the diversity of unlocking manners.

In some other alternative embodiments, the method further includes: turning on the screen and presenting a main menu interface after the mobile terminal is unlocked.

In these alternate embodiments, the screen is not lit (not turned on) when the front-facing camera is initially exposed, but is lighted up (turned on) as soon as the unlocking is successful so that the user does not need to wait for the unlocking when the screen is lit. Thus, not only is power saved, but also the user feels that the unlocking speed is higher, thereby improving the user's unlocking experience.

In still other embodiments, the method further includes: capturing a sliding event parameter generated by a Hall sensor in the mobile terminal; and determining whether a sliding action has occurred on the sliding module in accordance with the sliding event parameter.

In these embodiments, when the user applies a sliding action on the sliding module, the Hall sensor in the mobile terminal detects the sliding action, so that the mobile terminal can perform subsequent operations.

It should be noted that, the foregoing steps S11-S12 and the various alternative embodiments may be combined randomly.

Figure 5:
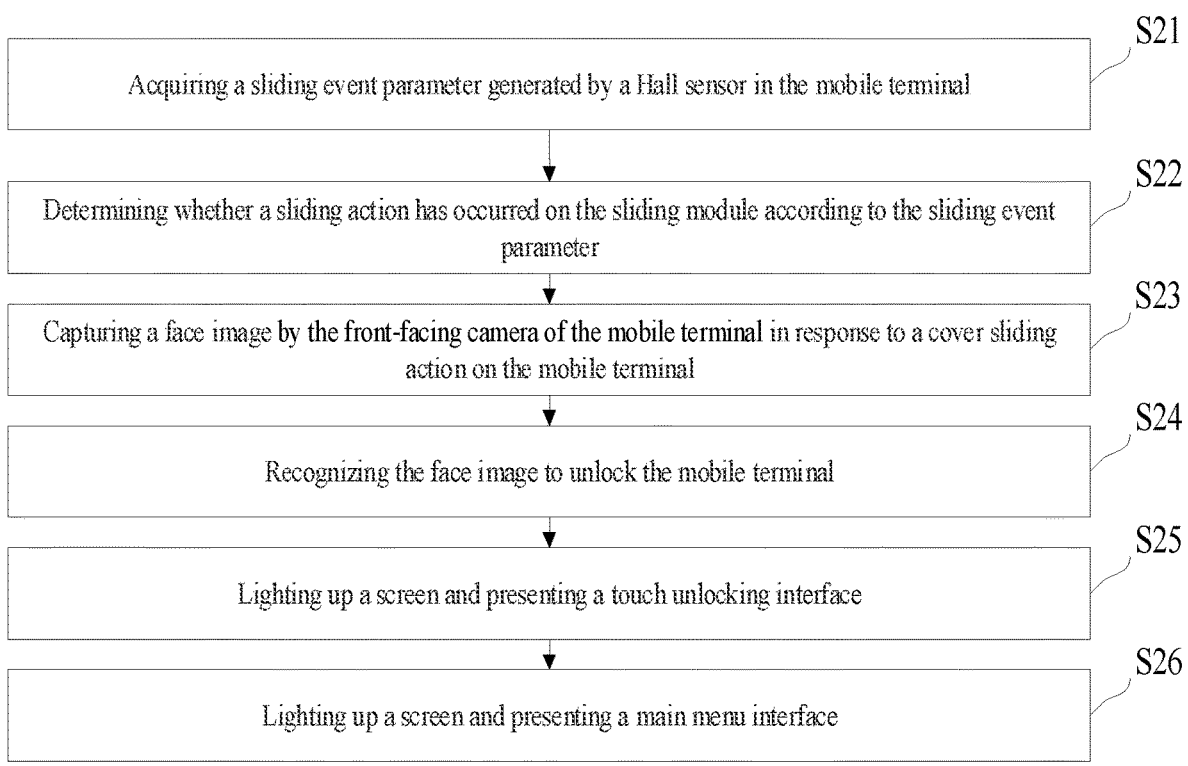
FIG. 5 shows a flowchart of another unlocking method according to some embodiments.

FIG. 5 is a flowchart of an unlocking method executed by a mobile terminal according to another exemplary embodiment. Referring to FIG. 5, the unlocking method includes the following steps.

In step S21, a sliding event parameter generated by a Hall sensor in the mobile terminal is acquired.

In this step, whether a sliding action has occurred on the sliding module is determined in accordance with the sliding event parameter. Here the term "sliding action" refers to an action of exposing the front-facing camera disposed on the sliding module, and can be detected by a Hall sensor in the mobile terminal which may be arranged on a rear cover of the mobile terminal. Advantageously, the sliding module in the mobile terminal is provided with a magnet. When the module slides, a magnetic field generated by the magnet changes; and the Hall sensor can detect the sliding action by detecting the change of the magnetic field and generate a sliding event parameter.

In some embodiments of the present disclosure, a processor of the mobile terminal acquires the sliding event parameter generated by the Hall sensor in the mobile terminal through a listener. In some embodiments, the sensor is managed by a sensor manager in the mobile terminal. In such embodiments, the processor of the mobile terminal needs to acquire a sensor service from the sensor manager and register the listener with the sensor manager through the sensor service. Thus, when there is a sliding event, the sensor process will notify the mobile terminal through the listener.

Taking an Android operating system as an example, a processor can acquire the sensor service from the sensor manager by executing the following codes, and then register the listener.

```
mSensorManager=(SensorManager)context.getSystemService(Context.SENSOR_SER-
    VICE); // acquiring the SENSOR_SERVICE from the SensorManager
mSensor=mSensorManager.getDefaultSensor(SLIDE_COVER_SENSOR_TYPE, true);
    //acquiring a Hall sensor parameter for detecting the cover sliding action
mSensorManager.registerListener(mListener,mSensor,SensorManager.SENSOR_DELAY
    _NORMAL,mHandler); //registering the SensorEventListener
Private final SensorEventListener mListener = new SensorEventListener( ) {
        @Override
        Public void onSensorChanged(SensorEvent event) {
//When the user slides the cover and the parameter SensorEvent event sent by the Hall
    sensor changes, the SensorEventListener outputs the parameter SensorEvent event
        }
}
```

The Hall sensor notifies whether a sliding action has occurred currently by reporting the parameter SensorEvent event, that is, the value of the parameter SensorEvent event indicates whether a sliding action has occurred. The parameter SensorEvent event includes a parameter value; and different values of the parameter correspond to different positions of the module on which the front-facing camera resides. Therefore, the position of the sliding module can be determined in accordance with the value of the parameter. That is, whether a sliding action has occurred can be determined.

In step S22, whether a sliding action has occurred on the sliding module is determined in accordance with the sliding event parameter.

In this step, the processor determines whether a sliding action has occurred on the sliding module through a listener.

When the value of the SensorEvent event reported by the Hall sensor to the listener corresponds to a true sliding action, the listener outputs the parameter SensorEvent event to the processor, and the processor can determine whether a sliding action has occurred on the sliding module in accordance with the parameter SensorEvent event.

In step S23, when a sliding action occurs on the mobile terminal, a face image is captured by the front-facing camera of the mobile terminal.

When a user applies a sliding action to the sliding module, the Hall sensor in the mobile terminal detects the sliding action, and a sliding-type event is generated. When the processor of the mobile terminal receives the sliding-type event, it is determined that the Hall sensor has detected a sliding action on the mobile terminal; and then, a face image is captured for recognition to unlock the mobile terminal.

In step S22, if there is a sliding-type event, it means that the front-facing camera has been exposed. At this time, the front-facing camera is activated to capture a face image of the user; and the face image as captured is recognized for unlocking.

In this step, capturing the face image through the front-facing camera of the mobile terminal may include: detecting whether there is a face in a current image frame; and capturing the face image when there is a face in the current image frame.

Here, detecting whether there is a face in the current image frame can be implemented through a classifier. Suitable classifiers are known in the art and is not necessary to be repeated here.

In other embodiments, capturing a face image through the front-facing camera of the mobile terminal may include: loading an image capturing interface; and capturing a face image in response to the user's image capturing instruction. In this way, the user himself takes a picture of his face without an automated face detection process.

In step S24, the face image is recognized to unlock the mobile terminal.

When the face image fails to unlock the mobile terminal, step S25 is executed; and when the face image succeeds to unlock the mobile terminal, step S26 is executed.

In some embodiments, the manner of unlocking is by automatically recognizing the captured face image, rather than conventional manners of using password, gesture or fingerprint, so that a user needs not perform any additional operation.

In some further embodiments, unlocking the mobile terminal by recognizing the face image includes: comparing features between the face image and a preset face image to obtain a comparison result; and unlocking the mobile terminal when the comparison result indicates that the face image and the preset face image are from the same person; and if the comparison result indicates that the face image and the preset face image are from different persons, unlocking of the mobile terminal fails.

In the above embodiments, the features of the face image captured by the front-facing camera are compared with those of the preset face image in the mobile terminal to perform unlocking. The mobile terminal can only be successfully unlocked when the face image as captured and the preset face image are from the same person, which ensures security of the mobile terminal.

Here, comparing the features between the face image and a preset face image may include calling a face recognition algorithm to compare features between the face image and the preset face image. For example, a face recognition algorithm is preset in the mobile terminal system. When comparing the features, the acquired face image is directly sent to the face recognition subroutine implementing the algorithm, which then determines whether the face features in the face image and those in the preset face image input in advance are consistent or not. If yes, it means that the face image and the preset face image are from the same person; and if not, it means that the face image and the preset face image are from different persons.

Here, the face recognition algorithm determines whether the face image and the preset face image are from the same person by extracting feature points from the face image and then comparing the feature points with those in the preset face image input in advance through a feature analysis method. The foregoing feature analysis method may be a geometric feature analysis method, a local feature analysis method, a feature face method, an elastic model method, a neural network method, or the like.

In some embodiments, the face recognition algorithm may be an existing face recognition algorithm, such as a face recognition algorithm provided by SenseTime, or any other suitable face recognition algorithm commonly known in the art.

Further, prior to comparing the features between the face image and the preset face image, the method may further include preprocessing the face image. The preprocessing may include: recognizing a face region in the face image; and cropping the face region in the face image to obtain a face image of a set size. Then, the comparison process is performed by using the face image of a set size.

Further, the method may also include: acquiring a preset face image. A manner of acquiring the preset face image may be the same as the process of capturing the face image in steps S23 and S24, which are not repeated herein.

A setting option of the mobile terminal may include a preset face image setting item through which the user may input the preset face image.

Further, the preset face image may include face images of the same user from different angles, so as to improve the accuracy of unlocking through the face image.

The preset face image may include preset face images of a plurality of users, so that the mobile terminal may be unlocked by the plurality of users. When the preset face image includes the preset face images of a plurality of users, the comparing process in step S23 includes: sequentially comparing features of the face images shot by the front camera with the features of the preset face images of each of the users.

In step S25, a screen is lighted up and a touch unlocking interface is presented.

The touch unlocking interface may be a password unlocking interface, a gesture unlocking interface, or a fingerprint unlocking interface. When the face image unlocking fails, the touch unlocking interface may be presented to allow the user to enter a password, gesture or fingerprint for unlocking, thereby increasing the diversity of the unlocking manners.

Step S25 is an optional step. When there is no step S25, as the unlocking fails, the mobile terminal would not light up the screen and remain in a locked state. Subsequently, the user can light up the screen through a power button. Then, the mobile terminal receives a screen lighting instruction from the user, and presents the touch unlocking interface to allow the user to perform touch unlocking.

Further, the method may also include: receiving a password, gesture or fingerprint input by the user through the touch unlocking interface; and using the password, gesture or fingerprint as an unlocking key.

Further, the method may also include: receiving a password, gesture or fingerprint input by the user through the touch unlocking interface; comparing features between the password, gesture or fingerprint and the unlocking key; executing step S26 if the password, gesture or fingerprint and the unlocking key are the same, or presenting an unlocking failure prompt if the password, gesture or fingerprint and the unlocking key are different.

In step S26, the screen is lighted up and a main menu interface is presented.

In this embodiment, the screen is not lighted when the front-facing camera is initially exposed, but is lighted immediately after the unlocking is successful so that the user does not have to wait for the unlocking process to have the screen is lighted. Thus, not only is power saved, but also the user feels that the unlocking speed is higher, improving the user unlocking experience.

Figure 6:
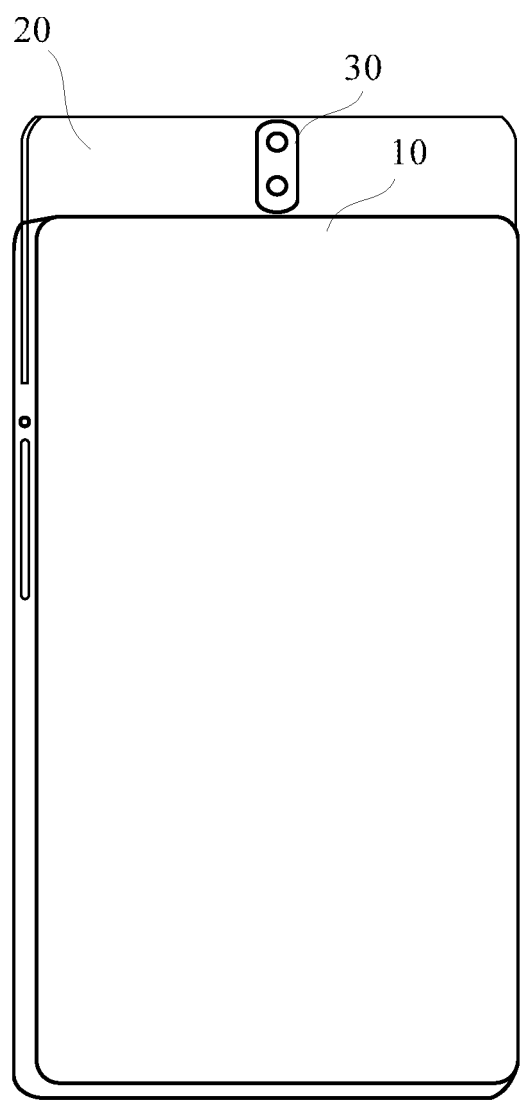
FIG. 6 shows a front view of a mobile terminal in an unlocking process with the sliding module in an exposed position according to some embodiments.
Figure 7:
FIG. 7 shows an exemplary mobile terminal interface after successful unlocking according to some embodiments.

Prior to the sliding action occurring, the state of the mobile terminal is as shown in FIG. 1. At this time, the front-facing camera is in a retracted state, and the screen is turned off. FIG. 6 is a schematic view of a mobile terminal interface displayed in an unlocking process. Referring to FIG. 6, when a sliding action occurs, the front-facing camera 30 would be exposed, but the screen is still not lighted at this time. FIG. 7 is a schematic view of the mobile terminal interface after successful unlocking. Referring to FIG. 7, after the front-facing camera 30 completes the face image capturing and the unlocking is successfully achieved by recognizing the captured face image, the screen is lighted and the main menu interface is displayed.

In other alternate embodiments, step S26 may also be implemented in the following manner: in step S23, lighting the screen of the mobile terminal and displaying an unlocking interface when the front-facing camera is initially exposed; and, after unlocking the mobile terminal, in step S26, displaying the main menu interface.

Further, an enable button of a sliding unlocking function may be preset in the mobile terminal, and may be set in a setting menu of the system. The user may select whether to enable the sliding unlocking function through the enable button. Correspondingly, the mobile terminal receives a user's enable button selection instruction, and controls the sliding unlocking function to be enabled or disabled in accordance with the enable button selection instruction. When the sliding unlocking function is enabled, the mobile terminal executes steps S21-S26. When the sliding unlocking function is disabled, the mobile terminal does not execute steps S21-S26.

Figure 8:
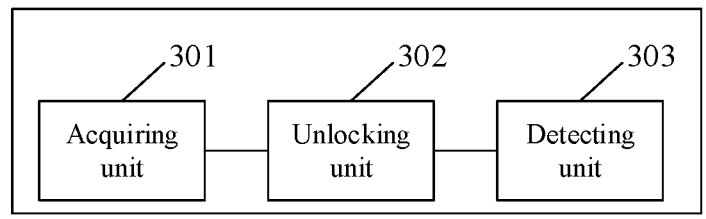
FIG. 8 shows a block diagram representing the architecture of an unlocking mechanism according to some embodiments.

FIG. 8 is a block diagram showing an exemplary architecture of an unlocking device or mechanism according to some embodiments. Referring to FIG. 8, the unlocking device or mechanism includes an acquiring unit 301, an unlocking unit 302, and, optionally, a detecting unit 303. It will be understood that the device or mechanism of FIG. 8 is an integral part of a mobile terminal.

Referring again to FIG. 8, the acquiring unit 301 is configured to acquire a face image through a front-facing camera of the mobile terminal in response to a sliding action on the mobile terminal. The unlocking unit 302 is configured to unlock the mobile terminal by recognizing the face image as a key.

In some embodiments, the unlocking unit 302 is configured to compare features between the face image and a preset face image to obtain a comparison result, and unlock the mobile terminal when the comparison result indicates that the face image and the preset face image are from the same person; and if the comparison result indicates that the face image and the preset face image are from different persons, the unlocking of the mobile terminal fails.

In some embodiments, the unlocking unit 302 is further configured to light up the screen and present a touch-based unlocking interface when the comparison result indicates that the face image and the preset face image are from different persons and the unlocking of the mobile terminal fails.

In some embodiments, the unlocking unit 302 is further configured to light up the screen and present a main menu interface after the mobile terminal is unlocked.

In some embodiments, the device further includes a detecting unit 303. The detecting unit 303 is configured to acquire a sliding event parameter generated by a Hall sensor in the mobile terminal, and then determine whether a sliding action has occurred on the sliding module in accordance with the sliding event parameter.

A manner through which the acquiring unit 301 acquires the face image may refer to step S23. A manner through which the unlocking unit 302 unlocks the mobile terminal may refer to step S24. Detailed descriptions of these manners are omitted herein.

Figure 9:
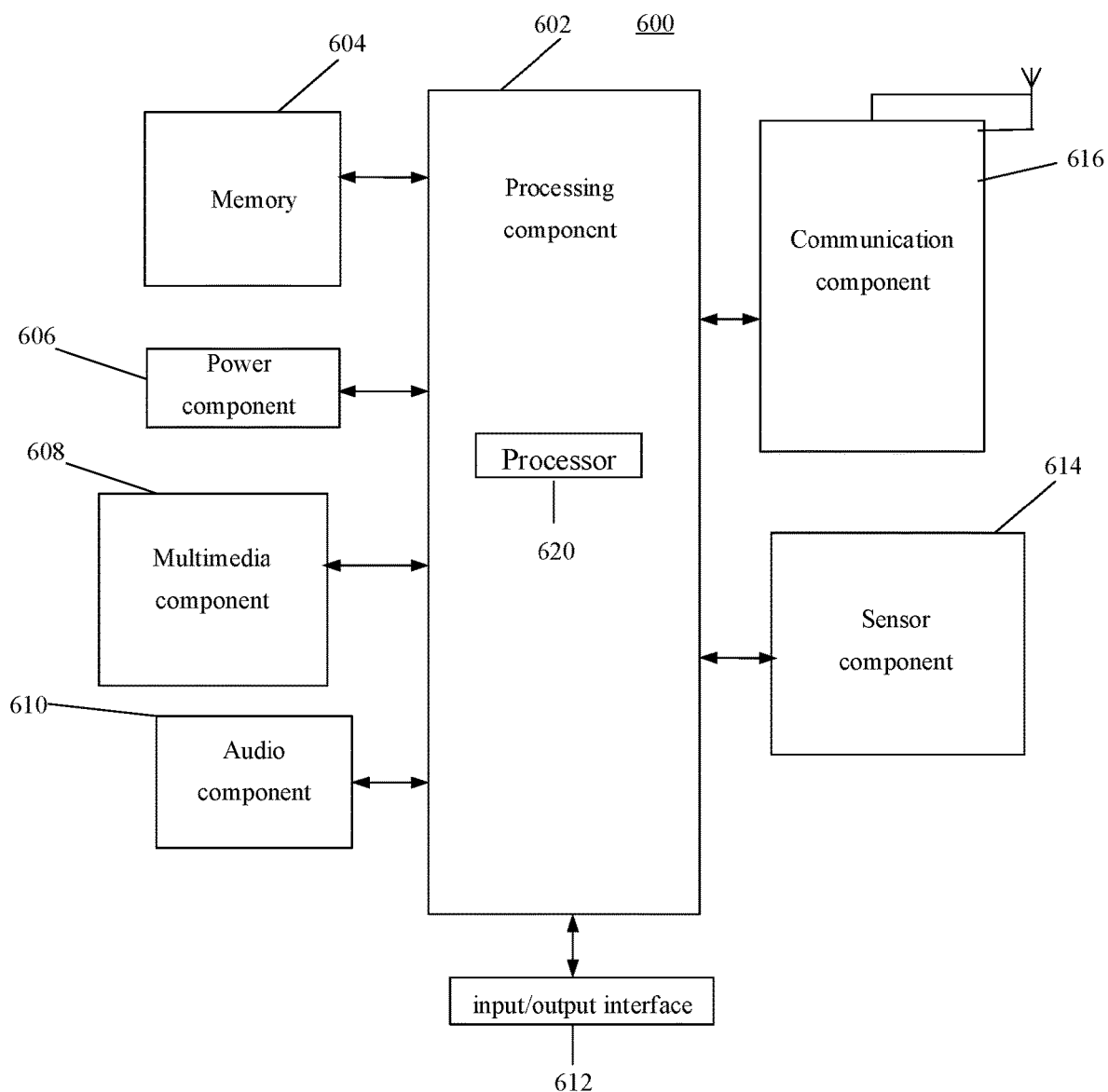
FIG. 9 shows a block diagram of the unlocking mechanism according to some embodiments.

FIG. 9 is a block diagram of an exemplary unlocking mechanism 600 shown according to one exemplary embodiment. The mechanism 600 may be set within a mobile phone as mentioned above. Referring to FIG. 9, the unlocking mechanism 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the unlocking mechanism 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation on the unlocking mechanism 600. Examples of such data include instructions for any applications or methods to be operative via the unlocking mechanism 600, contact data, phonebook data, messages, pictures, videos, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the unlocking mechanism 600.

The multimedia component 608 includes a screen providing an output interface between the unlocking mechanism 600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 608 includes a front-facing camera and/or a rear-facing camera. The front-facing camera and the rear-facing camera may capture image or video data while the unlocking mechanism 600 is in an operation mode, such as an acquiring mode or a video mode. Each of the front-facing camera and the rear-facing camera may be a fixed optical lens system or have focus and optical zoom capability.

The audio component 610 is configured to output and/or input audio signals. For example, the audio component 610 includes a microphone (MIC) configured to receive external audio signals when the unlocking mechanism 600 is in an operation mode, such as a call mode, a recording mode, and a voice recognition mode. The received audio signal may be further stored in the memory 604 or transmitted via the communication component 616. In some embodiments, the audio component 610 further includes a speaker for outputting audio signals.

The I/O interface 612 provides an interface between the processing component 602 and peripheral interface modules, such as a keyboard, a click wheel, buttons, and the like. The buttons may include, but are not limited to, a home button, a volume button, a start button, and a lock button.

The sensor component 614 includes one or more sensors to provide status assessments of various aspects of the unlocking mechanism 600. For instance, the sensor component 614 may include a Hall sensor for detecting the sliding action of the unlocking mechanism 600. The sensor component 614 may detect an on/off status of the unlocking mechanism 600, relative positioning of components, e.g., the display device and the mini keyboard operatively coupled with the unlocking mechanism 600, and the sensor component 614 may also detect a position change in the unlocking mechanism 600 or a component of the unlocking mechanism 600, presence or absence of user contact with the unlocking control mechanism 600, orientation or acceleration/deceleration of the unlocking control mechanism 600, and temperature change(s) in the unlocking control mechanism 600. The sensor component 614 may include a proximity sensor configured to detect the presence of nearby objects without any physical contact. The sensor component 614 may also include a light sensor, such as a CMOS or CCD image sensor, used in connection with imaging applications. In some embodiments, the sensor component 614 may also include an accelerometer sensor, a gyroscope sensor, a magnetic sensor, a pressure sensor, or a temperature sensor.

The communication component 616 is configured to facilitate communication, in a wired or wireless manner, between the unlocking control mechanism 600 and other devices. In an embodiment of the present disclosure, the communication component 616 can access a wireless network based on a communication standard, such as 2G, 3G, 4G, or 5G, or a combination thereof, so as to implement a physical downlink control signaling detection. In some embodiments, the communication component 616 receives broadcast signals or broadcast associated information from an external broadcast management system via a broadcast channel. Optionally, the communication component 616 further includes a near field communication (NFC) module.

In some embodiments, the unlocking control mechanism 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described unlocking methods.

In some embodiments, a non-transitory computer-readable storage medium including instructions is also provided, such as the memory 604 including instructions, executable by the processor 620 in the unlocking control mechanism 600, for performing the above-described unlocking methods. For example, the non-transitory computer-readable storage medium may be a ROM, a RAM, a CD-ROM, a magnetic tape, a floppy disc, an optical data storage device, and the like.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "up" or "down" or "left" or "right" or "below" or "above" or "upper" or "lower" or "horizontal" or "vertical" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for a user to unlock a mobile terminal, comprising:
    acquiring, by using a listener, a sliding event parameter generated by a Hall sensor in the mobile terminal, wherein the sliding event parameter is output by the listener registered through a sensor service of the Hall sensor when the sliding event parameter sent by the Hall sensor changes;
    determining whether a sliding action has occurred on a sliding module of the mobile terminal according to the sliding event parameter;
    capturing a face image of the user through a front-facing camera of the mobile terminal in response to a sliding action applied to the sliding module of the mobile terminal; and
    unlocking the mobile terminal by using the captured face image of the user as a key,
    wherein said front-facing camera is disposed on the sliding module, and different values of the sliding event parameter correspond to different positions of the sliding module.

2. The method of claim 1, wherein unlocking the mobile terminal by using the captured face image comprises:
    comparing features between the captured face image and a preset face image to obtain a comparison result; and
    unlocking the mobile terminal when the comparison result indicates that the face image and the preset face image are from the same person.

3. The method of claim 2, further comprising:
    turning on a screen of the mobile terminal and presenting a touch-based unlocking interface when the comparison result indicates that the captured face image and the preset face image are from different persons.

4. The method of claim 2, further comprising:
    turning on a screen of the mobile terminal and presenting a main menu interface immediately after the mobile terminal is unlocked.

5. A mobile terminal having an unlocking mechanism, comprising:
    a screen;
    a sliding module having a front-facing camera disposed thereon;
    a processor; and
    a memory configured to store an instruction executable by the processor,
    wherein the processor is configured to:
    acquiring, by using a listener, a sliding event parameter generated by a Hall sensor in the mobile terminal, wherein the sliding event parameter is output by the listener registered through a sensor service of the Hall sensor when the sliding event parameter sent by the Hall sensor changes, wherein different values of the sliding event parameter correspond to different positions of the sliding module;
    determining whether a sliding action has occurred on the sliding module of the mobile terminal according to the sliding event parameter;
    analyze a face image of a user captured through the front-facing camera disposed on the sliding module of the mobile terminal in response to a sliding action applied to the sliding module; and
    unlock the mobile terminal by using the captured face image as a key.

6. The mobile terminal of claim 5, wherein unlocking the mobile terminal by using the captured face image comprises:
    comparing features between the face image and a preset face image to obtain a comparison result; and
    unlocking the mobile terminal when the comparison result indicates that the face image and the preset face image are from the same person.

7. The mobile terminal of claim 6, wherein the processor is further configured to:
    turn on the screen and present a touch-based unlocking interface when the comparison result indicates that the face image and the preset face image are from different persons.

8. The mobile terminal of claim 6, wherein the processor is further configured to:
    turn on the screen and present a main menu interface immediately after the mobile terminal is unlocked.

9. A non-transitory computer-readable storage medium having instructions stored therein for execution by a processor to cause a mobile terminal having a sliding module and a front-facing camera disposed on said sliding module to execute an unlocking method comprising:
    acquiring, by using a listener, a sliding event parameter generated by a Hall sensor in the mobile terminal, wherein the sliding event parameter is output by the listener registered through a sensor service of the Hall sensor when the sliding event parameter sent by the Hall sensor changes, wherein different values of the sliding event parameter correspond to different positions of the sliding module;
    determining whether a sliding action has occurred on the sliding module of the mobile terminal according to the sliding event parameter;
    capturing a face image of a user through the front-facing camera in response to a sliding action applied on the sliding module; and
    unlocking the mobile terminal by using the captured face image as a key.

10. The computer-readable storage medium of claim 9, wherein unlocking the mobile terminal by using the captured face image comprises:
    comparing features between the captured face image and a preset face image to obtain a comparison result; and
    unlocking the mobile terminal when the comparison result indicates that the face image and the preset face image are from the same person.

11. The computer-readable storage medium of claim 10, wherein the method further comprises:
    turning on a screen of the mobile terminal and presenting a touch-based unlocking interface when the comparison result indicates that the face image and the preset face image are from different persons.

12. The computer-readable storage medium of claim 10, wherein the method further comprises:
    turning on a screen of the mobile terminal and presenting a main menu interface immediately after the mobile terminal is unlocked.

13. The mobile terminal of claim 6, wherein:
    the screen is a front-facing screen, and the mobile terminal further comprises a rear body;

a sliding grove is formed between the front-facing screen and the rear body; and the sliding module is configured to be sandwiched between the front-facing screen and the rear body, and move vertically along the sliding groove to expose the front-facing camera and realize the sliding action.

14. The mobile terminal of claim 13, wherein the mobile terminal is configured to be unlocked without the user pressing a power button to turn on the screen, thereby avoiding the user waiting for the unlocking with the screen turned on, saving power while improving unlocking speed.

15. The mobile terminal of claim 14, wherein the mobile terminal is configured to be unlocked without the user inputting an unlocking password or a gesture on an unlocking interface.

16. The mobile terminal of claim 15, wherein the mobile terminal is configured to be unlocked with a single operation of the sliding action.

* * * * *